O. P. WILHELM.
AUTOMATIC SLACK ADJUSTER FOR BRAKE GEARS.
APPLICATION FILED JUNE 19, 1914.
1,193,100.
Patented Aug. 1, 1916.
2 SHEETS—SHEET 1.
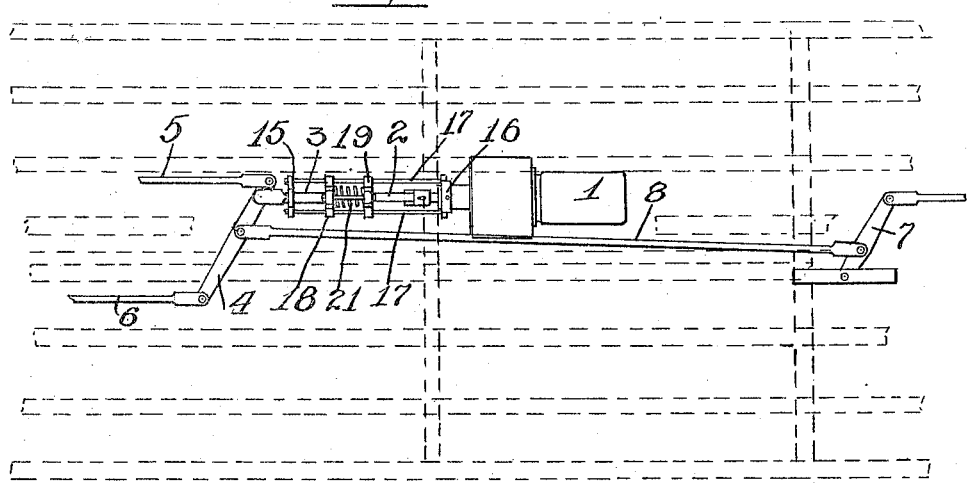
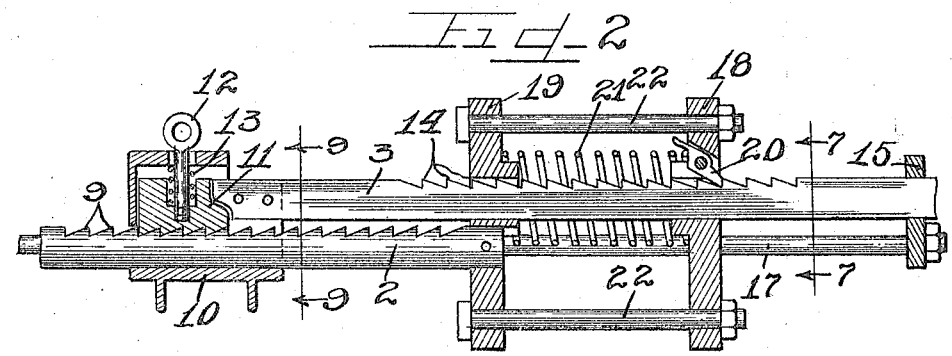
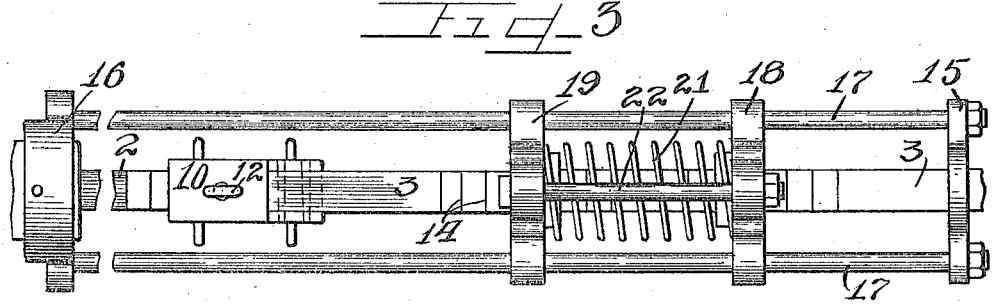

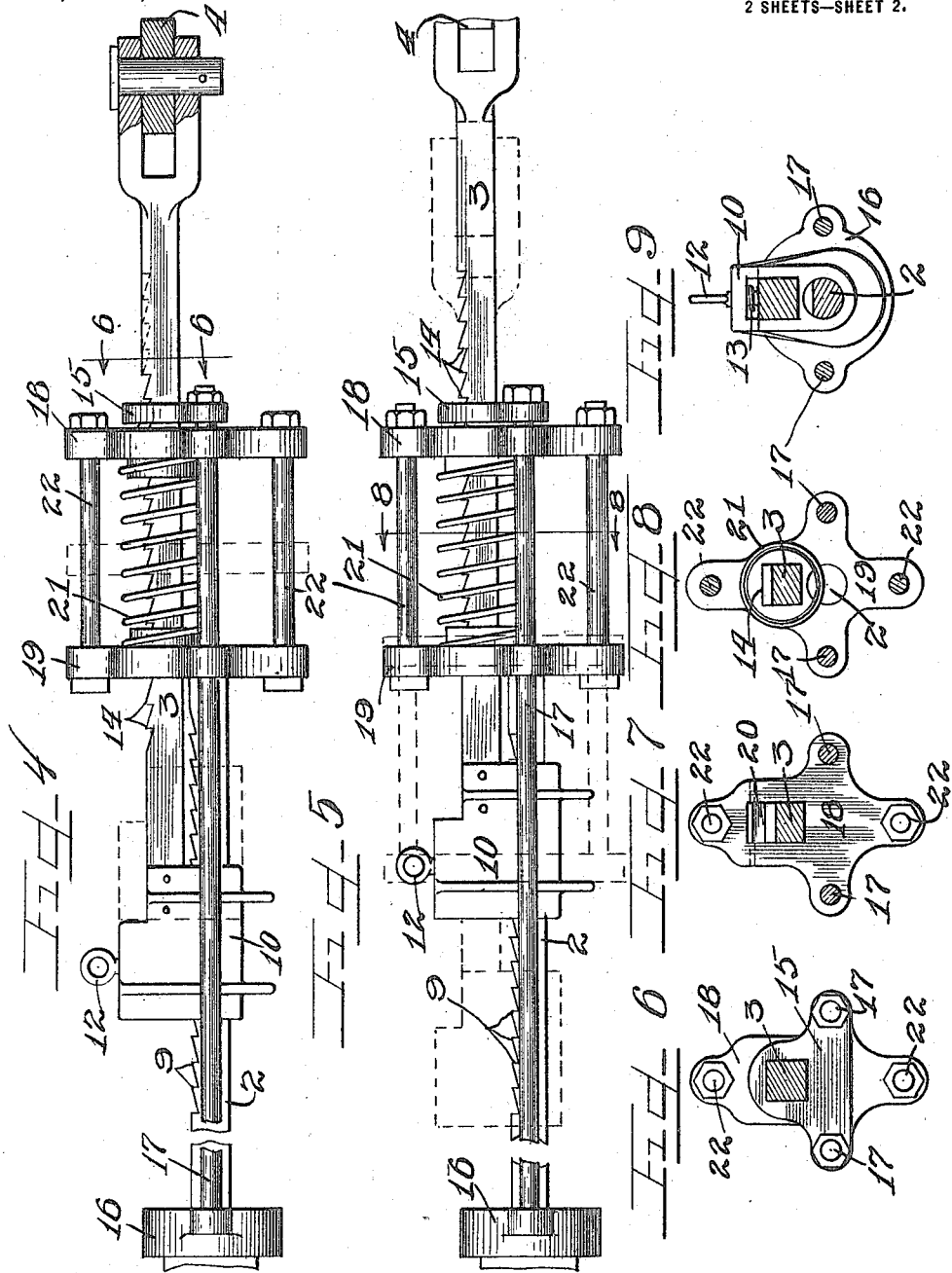

UNITED STATES PATENT OFFICE.

OLIVER P. WILHELM, OF MICHIGAN CITY, INDIANA, ASSIGNOR OF TWENTY-FIVE ONE-HUNDREDTHS TO SANFORD S. WILHELM AND SEVENTEEN AND ONE-HALF ONE-HUNDREDTHS TO LANE WILHELM, BOTH OF MICHIGAN CITY, INDIANA, AND TWENTY-FIVE ONE-HUNDREDTHS TO BEN LOEWENTHAL, OF CHICAGO, ILLINOIS.

AUTOMATIC SLACK-ADJUSTER FOR BRAKE-GEARS.

1,193,100.   Specification of Letters Patent.   Patented Aug. 1, 1916.

Application filed June 19, 1914.   Serial No. 846,049.

*To all whom it may concern:*

Be it known that I, OLIVER P. WILHELM, a citizen of the United States, and a resident of Michigan City, Laport county, and State of Indiana, have invented certain new and useful Improvements in Automatic Slack-Adjusters for Brake-Gears; and I do hereby declare that the following is a full, clear, and exact description of the same, reference being had to the accompanying drawings, and to the numerals of reference marked thereon, which form a part of this specification.

The air brakes on a car are often caused to operate in an inefficient manner, owing to the increase in movement demanded as the brake shoes become worn, and sometimes practically the full travel of the piston in the air cylinder is then required in order to thrust the brake shoes into contact with the car wheels. It is well known that the most efficient point in the relation of the parts in the application of a braking force, is that in which the piston in the air cylinder has only completed a portion of its stroke, at this position the arrangement of the mechanisms insuring proper pressure of contact between the brake shoe and the car wheel. Accordingly, in the present invention I purpose to construct a simple acting and efficient means for taking up the play or slack in the gear which occurs as the brake shoes wear down, so that substantially the same travel of the piston in the air cylinder is required at all times during the life of the brake shoes to effect a proper braking of the car. Accordingly, I connect to the air cylinder a pair of longitudinally disposed push rods having ratchet engagement mechanisms connecting the same, so that the slack in the brake gear may be automatically taken up by a movement of said respective rods to elongate the gear an amount sufficient to compensate for the wear upon the brake shoes.

It is an object of this invention to construct a device acting automatically to compensate for the wear on brake shoes by taking up the slack in the brake gear.

It is also an object of this invention to construct a slack adjusting mechanism for brake gears wherein a plurality of slidable members are yieldingly connected together, and in a manner to lock the same in various positions of adjustment to hold the same in a fixed position after a change in length of the mechanism.

It is also an object of this invention to construct a compensating mechanism for use on brake gears to take up the slack therein employing a plurality of toothed rods each having a ratchet mechanism associated therewith so mounted as to lock said bars in various positions after an additional increment in the total length thereof has been made.

It is furthermore an object of this invention to construct a compensating gear adapted to automatically increase its length to take up for wear on the brake shoes in a brake mechanism and embodying adjustably mounted parts yieldably connected to one another.

It is finally an object of this invention to construct a simple type of compensating mechanism for brake gears easily assembled and readily installed for use with standard car equipments and acting efficiently to perform the purpose.

The invention (in a preferred form) is illustrated in the drawings and hereinafter more fully described.

In the drawings: Figure 1 is a diagrammatic top plan view of a portion of a brake gear illustrating the adaptation of my invention thereto. Fig. 2 is a side elevation of my device partly in section. Fig. 3 is a top plan view thereof. Fig. 4 is a side elevation with the parts in a different adjustment, and illustrating the operation in dotted lines. Fig. 5 is a side elevation of the parts in still another adjustment, with the operation illustrated in dotted lines. Fig. 6 is a section on line 6—6 of Fig. 4. Fig. 7 is a section on line 7—7 of Fig. 2. Fig. 8 is a section on line 8—8 of Fig. 5. Fig. 9 is a section on line 9—9 of Fig. 2.

As shown in the drawings: The reference numeral 1, indicates a brake cylinder, and connected to be actuated thereby is a push rod 2. Another push rod 3, is adjustably connected, as hereinafter described, with said push rod 2, and at its end is linked to a cylinder lever 4. Connected on one end of said cylinder lever is a hand brake rod 5, and on the other end thereof is a top rod 6. A floating lever 7, is mounted beyond the cylinder 1, near the end thereof opposite that near which said cylinder lever 4, is mounted, and connecting said respective levers 4 and 7, is a cylinder lever rod 8. One side of said push rod 2, which is of circular cross section, is provded with a series of ratchet teeth 9, and slidably mounted upon said rod is a carriage 10, which is cored out to receive slidable vertically therein, a toothed ratchet block 11. An eye bolt 12, engages slidably through an aperture in the top wall of the carriage 10, and is threaded into said block 11, with a compression spring 13, wound about said bolt, and acting normally to hold said block 11, downwardly in engagement with the teeth 9, of said push rod. The long push rod 3, is rigidly secured upon said carriage 10, said rod being of rectangular cross section and on its upper surface is provided with a series of ratchet teeth 14, which are directed oppositely to those 9, of the push rod 2. A fixed plate or stop 15, through which said push rod 3, slidably extends, and another fixed plate or boss 16, connected on the cylinder, are rigidly secured upon opposite ends of horizontal guide rods 17. Slidably mounted upon said guide rods 17, are the respective blocks 18 and 19, each also slidable upon said push rod 3, the former provided with a pivoted pawl 20, adapted to engage the teeth 14, of said push rod, and the latter rigidly connected to the push rod 2. A heavy compression spring 21, is wound about said push rod 3, between said respective blocks 18 and 19, and acts to hold the same normally spaced from one another, and to hold said pawl 20, downwardly in engagement with the teeth of the push rod. Bolts 22, are secured in the block 18, and extend slidably through the block 19, so that by compressing the spring 21, said block 19, may move toward the block 18, sliding upon the bolts 22.

The operation is as follows: The device is illustrated in normal position in Figs. 2 and 3. When the mechanism is actuated by the cylinder 1, the push rod 2, moves forwardly, thus thrusting the push rod 3, along by means of the ratchet block 11, until the block 18, which is moved by the block 19, through the spring 21, contacts the fixed block or plate 15. It is assumed that when the parts are in proper adjustment that the brakes are properly applied at this point in the movement of the gear, but, however, should there be a slack which should be taken up, further movement of the rod 3, by the rod 2, causes compression of the spring 21, and a movement of the rod 3, through the block 18, the pawl 20, tracking over the teeth on said rod 3. This movement continues until the brakes have been properly applied with the requisite pressure, and then the push rod 2, being released by the cylinder 1, the same moves rearwardly under the compression of the spring 21, in this instance the ratchet block 11, tracking over the teeth 9, until the spring 21, has expanded its full amount, and then both said push rod 3 and said push rod 2, move rearwardly as a whole to retract the brake shoes from the car wheel. So long as the mechanism is in proper adjustment and no slack is evident in the gear, the push rods 2 and 3, move forwardly as a unit, but in the event of slack occurring, due to wear on the shoes, the spring 21, is compressed and relative movement takes place between the respective push rods and their respective ratchet mechanisms to lock the rods in another position of adjustment, adding an increment to the length thereof, sufficient to compensate for the difference in movement required.

Figs. 4 and 5 show clearly the position of the parts during an adjusting movement thereof, the block 18, having been moved against the fixed block 15, and spring 21, is compressed, and the slidable block 19, and carriage 10, assume the positions shown in dotted lines in Fig. 4. Upon release of the air in the brake cylinders the parts are extended, due to the spring 21, and the lower push bar 2, is thrust through the carriage 10, until the new position of the carriage 10, as shown in full lines in Fig. 5, occurs, the parts then being in proper adjustment to insure no slack or excess travel in the brake gear.

I am aware that various details of construction may be varied through a wide range without departing from the principles of this invention. I therefore do not purpose limiting the patent granted otherwise than necessitated by the prior art.

I claim as my invention:

1. In a device of the class described a plurality of push bars, ratchet teeth formed thereon, yieldable connections between said push bars, a carriage slidable on one of said push bars and ratchet mechanism within said carriage for locking said push bars in various extended positions to automatically take up slack in a brake gear.

2. In an automatic adjusting mechanism for brake gears a plurality of push bars adjustably connected with one another, and a yieldable spring controlled connection between said push rods.

3. In a device of the class described slidably connected parallel push rods, a block secured on one of said push rods and slidable on the other thereof, another block slidable on said latter push rod, a pawl mounted in said latter block adapted to engage in recesses in said latter push bar to lock said block and bar together, a compression spring mounted between said respective blocks, and ratchet mechanism mounted on the latter of said push bars and slidably engaging the other thereof and adapted to lock said push bars one to another.

4. In a device of the class described a pair of push rods, ratchet mechanism mounted on one thereof to lock the same to the other push rod, and other ratchet mechanisms slidably mounted upon said first mentioned push rod and yieldably connected to the latter push rod, and also acting to lock said push rods one to another.

5. In a device of the class described a plurality of push rods, ratchet teeth on each thereof directed in opposite directions, and a ratchet mechanism secured to the end of each of said push rods, adapted to lock said push bars one to another to automatically take up slack in a brake gear after a lengthening movement between said respective push bars.

6. In a device of the class described a plurality of push bars adapted to be extended relative one another, ratchet teeth in each thereof, and a plurality of slidable ratchet mechanisms secured to said bars and acting to lock said push bars one to another in various adjustments after the same have been extended increments sufficient to take up slack in a brake gear.

7. In a device of the class described automatic slack adjusting mechanisms embracing parallel adjustably mounted push rods, a carriage slidably mounted on one of said rods and means therein locking the rods in various adjustments relative one another to increase the length of the device.

8. In a device of the class described, adjustably connected push rods, interlocking means secured to each thereof, the means secured to one of said rods slidably mounted on the other and adapted to act successively to lock said respective push rods in various extended positions.

9. In a device of the class described adjustably connected push rods, ratchet mechanism secured on one acting to lock the other push rod from movement in one direction, and ratchet mechanism connected on said latter rod and acting to engage said first mentioned rod to lock the same from movement in the other direction.

10. In an automatic slack adjusting mechanism slidably connected members, ratchet teeth thereon and directed oppositely on said respective members, means slidable on one of said members connecting said member to the other through an adjustable spring actuated ratchet latching means, and yieldably mounted mechanism connecting said latter member to said first mentioned member through another latching means.

11. In a device of the class described a pair of push rods, a carriage slidably mounted on one of said rods, a ratchet within said carriage for locking said rods, and means mounted in said carriage for adjusting said ratchet.

In testimony whereof I have hereunto subscribed my name in the presence of two subscribing witnesses.

OLIVER P. WILHELM.

Witnesses:
  LAWRENCE REIBSTEIN,
  FRANK K. HUDSON.

Copies of this patent may be obtained for five cents each, by addressing the "Commissioner of Patents, Washington, D. C."